United States Patent
Bulboaca

[19]

[11] Patent Number: 6,158,088
[45] Date of Patent: Dec. 12, 2000

[54] DEPLOYABLE HINGE ASSEMBLY PROVIDING END OF TRAVEL DAMPING

[75] Inventor: Michael A. Bulboaca, Littleton, Colo.

[73] Assignee: Lockheed Martin Corporation, Bethesda, Md.

[21] Appl. No.: 09/286,246

[22] Filed: Apr. 5, 1999

[51] Int. Cl.[7] .............................. E05F 1/08; E05D 11/10; E05D 11/06; F16C 11/00

[52] U.S. Cl. ............................... 16/291; 16/321; 16/375; 403/102

[58] Field of Search ................................ 16/321, 50, 374, 16/375, 291, 293; 244/173; 403/102

[56] References Cited

U.S. PATENT DOCUMENTS

| | | | |
|---|---|---|---|
| 4,063,330 | 12/1977 | Triplette ................................ | 16/321 X |
| 4,393,541 | 7/1983 | Hujsak et al. ........................ | 16/291 X |
| 4,532,674 | 8/1985 | Tobey et al. .......................... | 16/375 X |
| 4,561,614 | 12/1985 | Olikara et al. ........................ | 244/173 |
| 4,615,637 | 10/1986 | Pelischek ............................. | 403/102 X |
| 5,356,095 | 10/1994 | Aker ..................................... | 244/173 |

OTHER PUBLICATIONS

Drawing of Existing Prior Art Solar Panel Hinge Assembly.

*Primary Examiner*—Anthony Knight
*Assistant Examiner*—Robert L. Pilaud
*Attorney, Agent, or Firm*—Louis L. Dachs

[57] ABSTRACT

The invention is a deployable hinge assembly. In detail the hinge assembly includes first and second hinge members, and a pivot system for pivotally connecting the first and second hinge members together such that the second hinge member is rotatable from an over lapping position with the first hinge member to an inline position therewith. An over center latch mechanism is coupled to the first and second hinge members for moving the second hinge member from the over lapping position to the inline position and locking the second hinge member in the inline position upon activation. A spring is used for activating the over center latch mechanism. Finally, an attenuation device is incorporated for absorbing forces generated by the spring the second hinge member approaches the said position.

4 Claims, 6 Drawing Sheets

DEPLOYMENT TORQUE

DEPLOYABLE HINGE ASSEMBLY PROVIDING END OF TRAVEL DAMPING

BACKGROUND OF THE INVENTION

1. Field of the Invention

The invention relates to the field of hinge assemblies for coupling two structures together and for rotating one structure from an over lapping position with the other structure to an in line position therewith and, in particular, to a hinge assembly for extending fragile structures such as solar panels on a satellite in orbit wherein excess rotational energy is absorbed reducing stress loads on the structures.

2. Description of Related art

The cost of putting a satellite in orbit increases in proportion to its weight and size. Thus such satellites are constructed of light weight materials with small margins of safety on strength. Therefore, the solar panels that provide power once in orbit are stored in a folded position until orbit is reached. In addition, they are designed from a strength standpoint for deployment only after orbit is reached. When deploying such fragile structures in orbit, great care must be taken to insure that the loads induced on the individual panels as they are unfolded will not cause damage thereto. In particular, the sudden deceleration forces of the panels as they reach the unfolded in line position can cause over stressing of the individual panels, especially if the panels are caused to oscillate as they reach the in line position. If the damage is significant, complete failure of the satellite may occur.

This problem has long been recognized. For example, U.S. Pat. No. 4,561,614 "Deployable Folded Multi-Element Satellite Subsystems" by P. Olikara, et al. discloses a spring biased hinge incorporating viscous fluid dampers to absorb or dampen such forces. Each of the dampers includes a heater and thermostat to maintain the same damper temperature in each hinge assembly to insure that all the panels unfold at the same rate. However, such a system is complicated and heavy. It may also not provide the high reliability required in modern satellite systems.

U.S. Pat. No. 5,356,095 "Attenuating Linked Deployment Apparatus" by G. I. Aker discloses a hinge assembly wherein the hinge members are biased to the open or inline position by a coil (torsional) spring mounted on the hinge axis. One of the hinges has a "projecting lobe portion" having a surface that is adapted to contact a load attenuator mounted on the other hinge member. Contact occurs just prior to the hinge members reaching the in line position, thus damping out any oscillatory forces. A cam locking system is included that locks the projecting lobe portion in place, and thus the hinge member, when the hinge member reaches the in line position or unfolded (deployed) position. While this design should offer increased reliability over the P. Olikara, et al. design, a separate locking system adds weight and may jam, preventing full deployment of the hinge members.

Thus, it is a primary object of the invention to provide a hinge assembly is suitable for unfolding fragile structures such as solar panels on satellites in orbit.

It is another primary object of the invention to provide a hinge assembly that reduces the shock loads upon the hinge members reaching the in line position.

It is a further object of the invention to provide a hinge assembly that automatically locks when reaching the in line position.

SUMMARY OF THE INVENTION

The invention is a deployable hinge assembly. In detail the invention includes first and second hinge members with a pivot assembly pivotally connecting the first and second hinge members together about an axis of rotation such that the second hinge member is rotatable from an over lapped position with the first hinge member to an inline position therewith. An over center latch mechanism is coupled to the first and second hinge members for moving the second hinge member from the over lapped position to the inline position and locking the second hinge member in the inline position upon activation.

The over center latch mechanism includes a member having a first end connected to the first hinge member and a second end terminating at a point offset from the axis of rotation of the first and second hinge members. A first link, having first and second ends, is pivotally connected by its first end to the second end of the member. A second link, having first and second ends, is pivotally connected by its first end to the second end of the first link and by its second end thereof pivotally connected to the second hinge member, such that upon actuation the first and second links are rotated to an over center relationship locking the second hinge member in the in line position.

Torsion springs mounted on the pivot axis of the first end of the first link biases the first link toward rotation about the pivot axis of its first end such that the second hinge member rotates to the in line position upon activation. However other devices can be used such as electric motor drives. A shock attenuation device is mounted on the first and second hinges for absorbing forces generated by the torsion spring moving the second hinge member to the in line position. In detail, the shock attenuation device includes a hole in a first surface of the second hinge and member has an elastomeric member mounted in the hole. A portion of the elastomeric member extends out of the hole. A mating second surface on the first hinge member is positioned such that as the second hinge member approaches the in line position, the first surface contacts the elastomeric member causing it to compress into the hole and, thereafter, the first surface contacts the second surface upon the second hinge member reaching the in line position. Of course, other shock attenuation devices may be used, such as crushable pellets.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
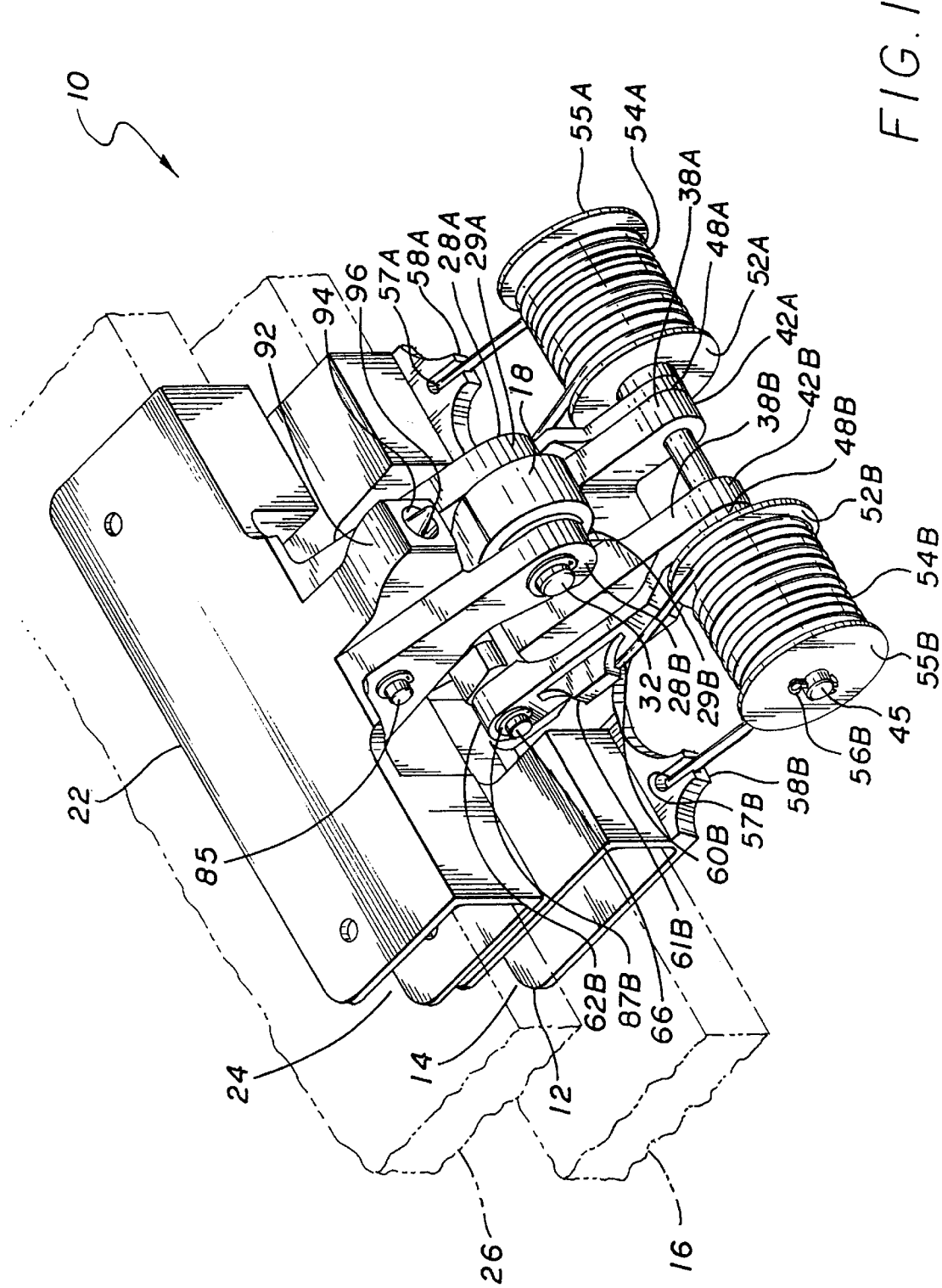
FIG. 1 is a perspective view of the hinge assembly in the over lapped position.
Figure 2:
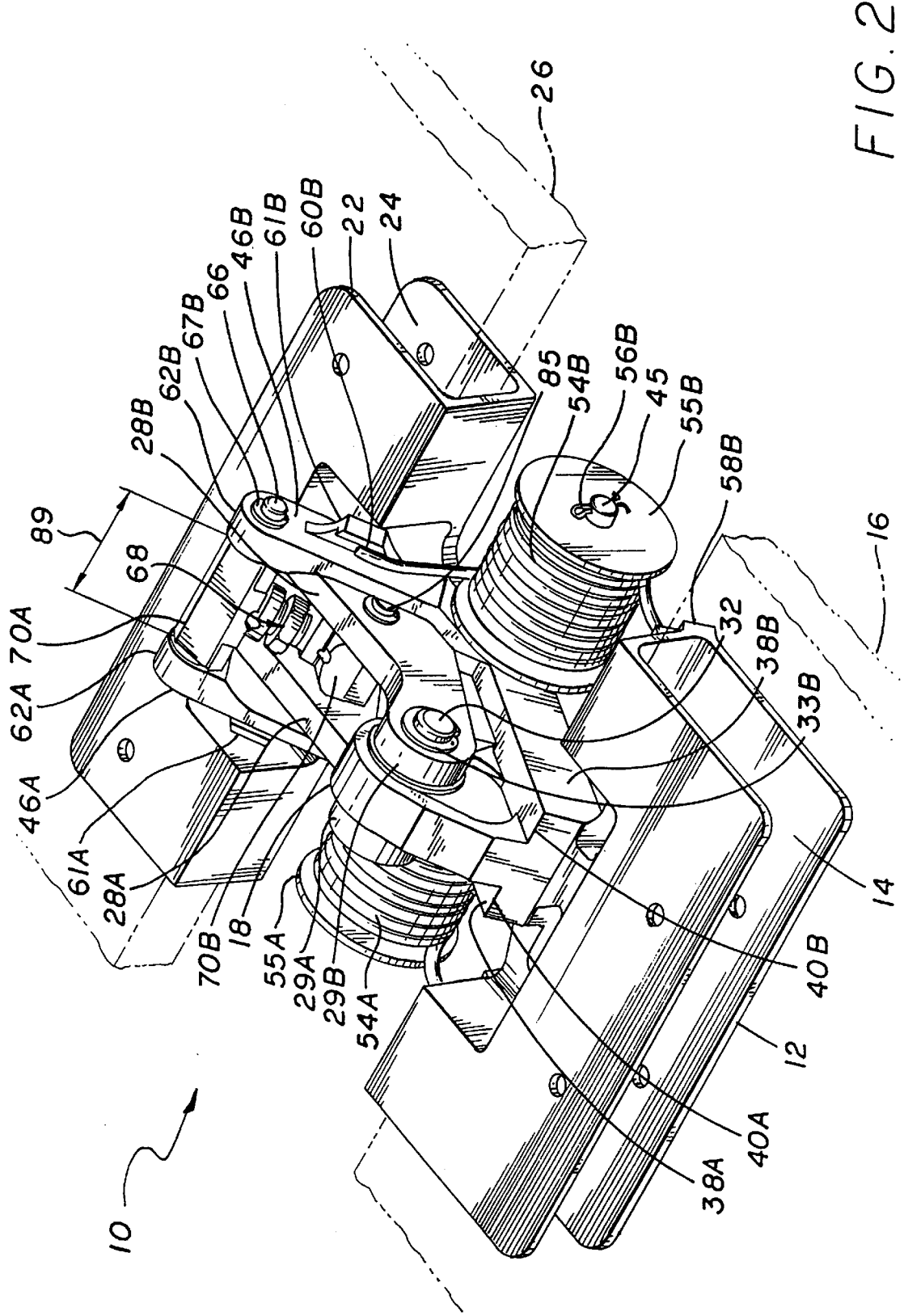
FIG. 2 is a perspective view of the hinge assembly in the in line position.
Figure 3:
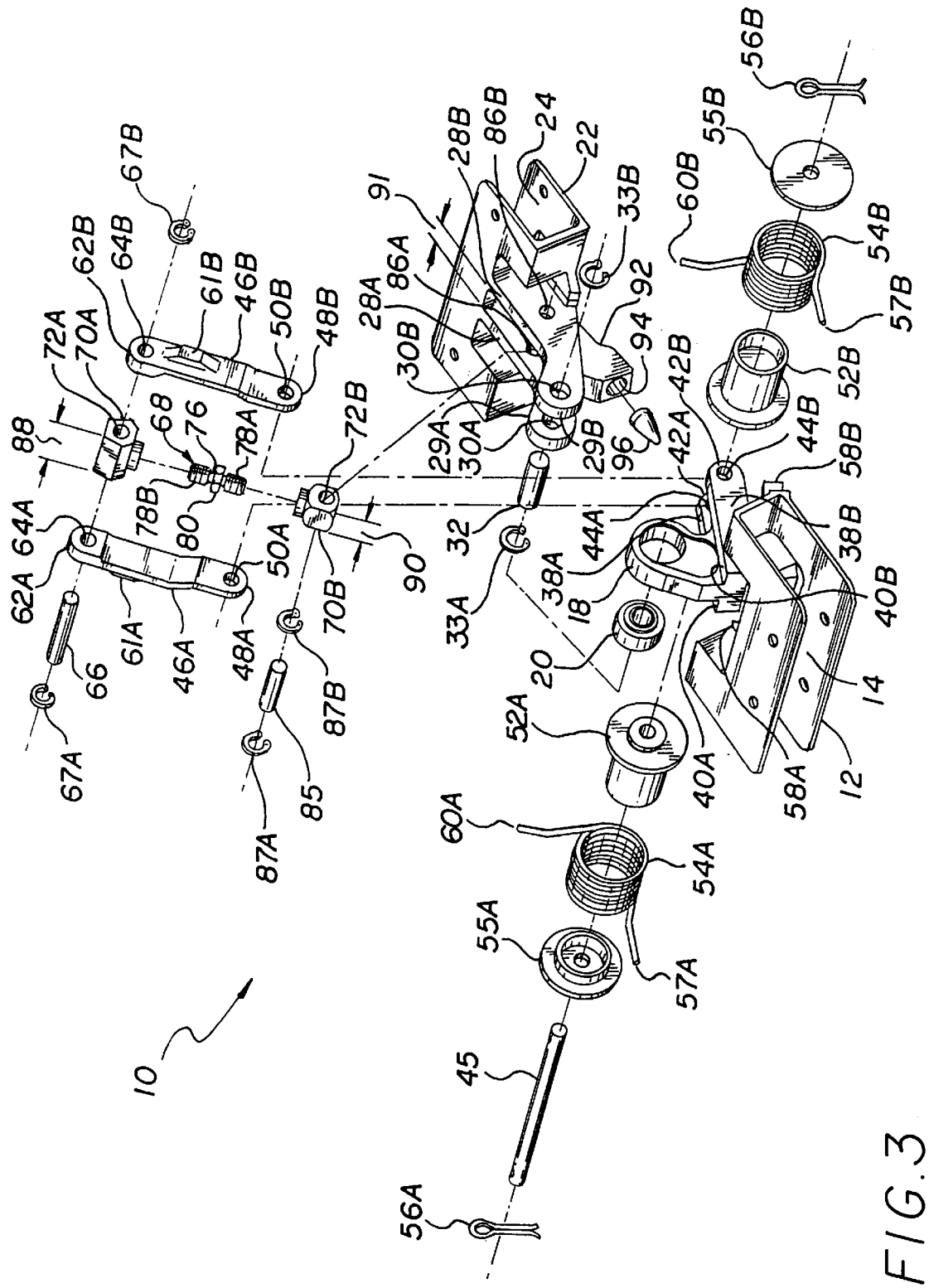
FIG. 3 is an exploded perspective view of the hinge assembly.

Referring to FIGS. 1, 2 and 3, the hinge assembly, generally indicated by numeral 10, includes a first hinge member 12 having a slot 14 for mounting a solar panel 16. The hinge member 12 includes a lug 18 having a bearing 20 mounted therein. A second hinge member 22 also includes a slot 24 mounting a second solar panel 26. The hinge member 22 further includes a pair of lugs 28A and 28B having end portions 29A and 29B with holes 30A and 30B therethrough. A pin 32 passing through the holes 30A and 30B in the lugs 28A, B and the hole 20 in lug 18 secures the two hinge members 12 and 22 together and allows rotation of hinge member 22 from the overlapped position shown in FIG. 1 to the in line position shown in FIG. 2, in a manner to be subsequently discussed. The pin 32 is held in place by retaining rings 33A and 33B.

The hinge member 12 further includes a pair of members 38A and 38B having first ends 40A and 40B on either side of the base of the lug 18 and second ends 42A and 42B having holes 44A and 44B therethrough. A pin 45 extends through the holes 44A, B. A pair of links 46A and 46B having first ends 48A and 48B with holes 50A and 50B therethrough are mounted by their first ends to the second ends 42AB of the members 38A, B by means of the pin 45, which passes through the holes 50A, B. Also mounted to the pin 45 outward of the links 46A, B are spring bushings 52A and 52 B having torsional springs 54A and 54B wound thereabout. The springs 54A, B are locked on to the bushings by retainers 55A and 55B and cotter pins 56A and 56B mounted on the ends of the pin 45. The ends 57A and 57B of the torsional springs 54A, B engage protrusions 58A and 58B on the hinge member 12 and ends 60A and 60B engage protrusions 61A and 61B on the links 46AB. Thus the torsional springs 54A, B bias the links 46A, B toward a clockwise rotation as shown in FIG. 1.

Figure 6:
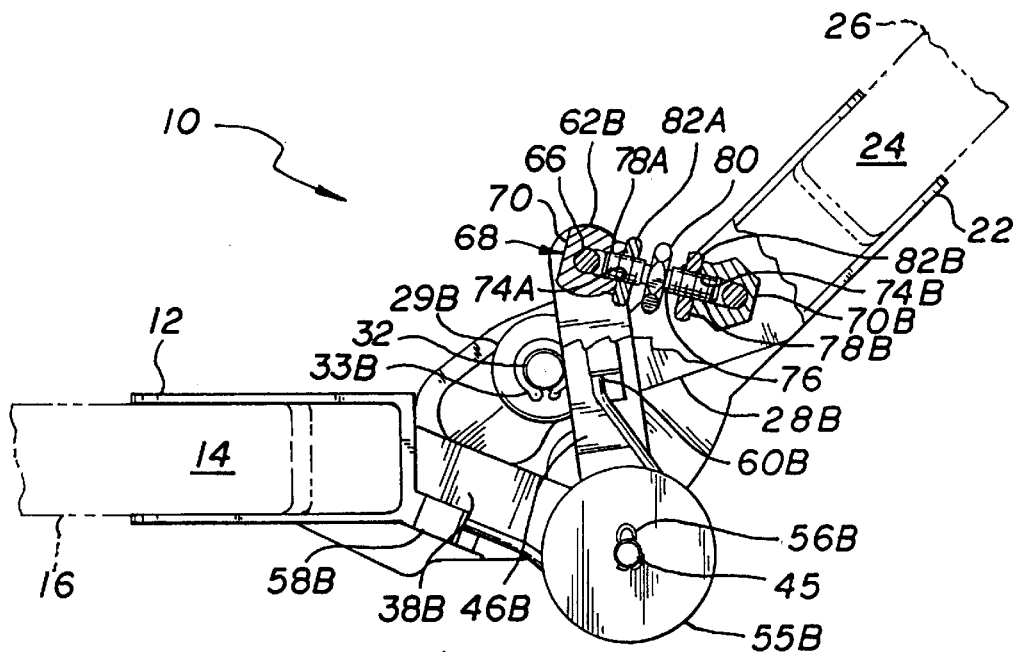
FIG. 6 is a side view of the hinge assembly in the 135 degree position.

Still referring to FIGS. 1–3 and, additionally, to FIG. 6, the second ends 62A and 62B of the links 46A, B also include holes 64A and 64B therethrough in which is mounted a pin 66 extending therebetween and secured in place by retaining rings 67A and 67B. A link 68 having end fittings 70A and 70B having holes 72A and 72B, respectively, therethrough. Each end fitting 70A, B further includes threaded holes 74A and 74B. A shaft 76 having threaded ends 78A and 78B engaging holes 74A, B and a hex shaped nut 80 rigidly attached thereto. Thus the over all length of the link 68 can be adjusted by varying the length of engagement of the threaded ends 78A, B with the threaded holes 74A, B. Jam nuts 82A and 82B secure the end fittings 70A, B in place. This link 68 is pivotally mounted by end fitting 70A to the pin 66 between the second ends 62AB of the links 46AB. The end fitting 70B is pivotally mounted to a pin 85 mounted in holes 86A and 86B in lugs 28A, B and which extends through the hole 72B and secured by retaining rings 87A and 87B. Note the end fittings 70A have a width 88 such that it fills the gap, indicated by numeral 89, between the ends 62A, B of the links 46A, B. In addition, the end fitting 70B has a width 90 such that it fills the gap, indicated by numeral 91, between the lugs 28A, B. This insures that the link 68 remains properly aligned.

Figure 4:
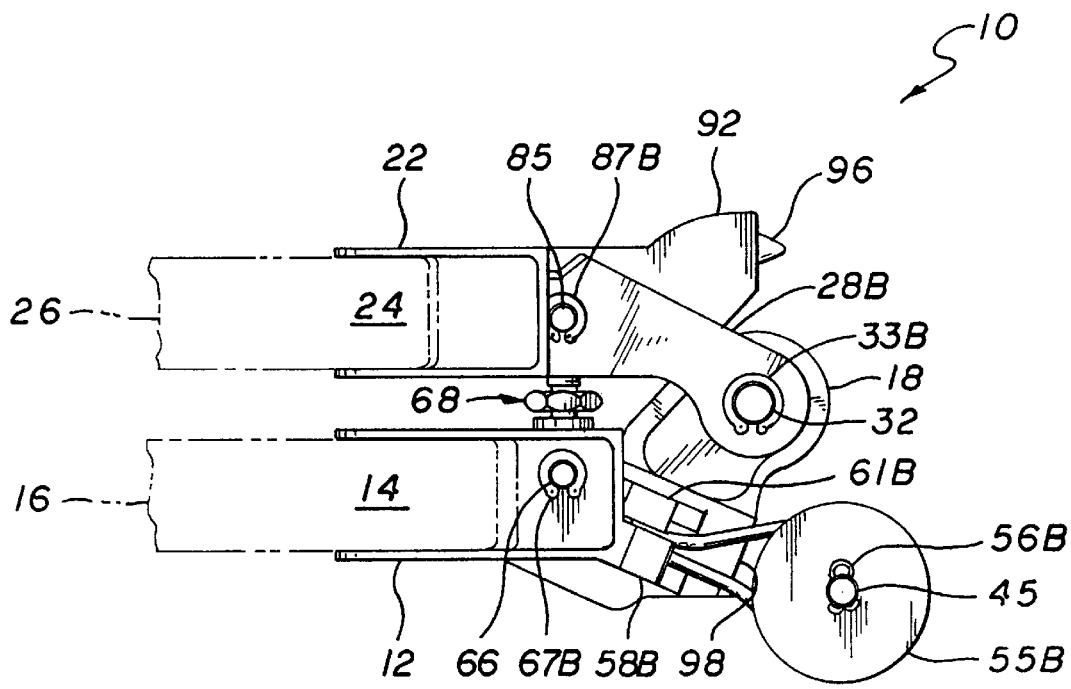
FIG. 4 is a side view of the hinge assembly in the over lapping position.
Figure 5:
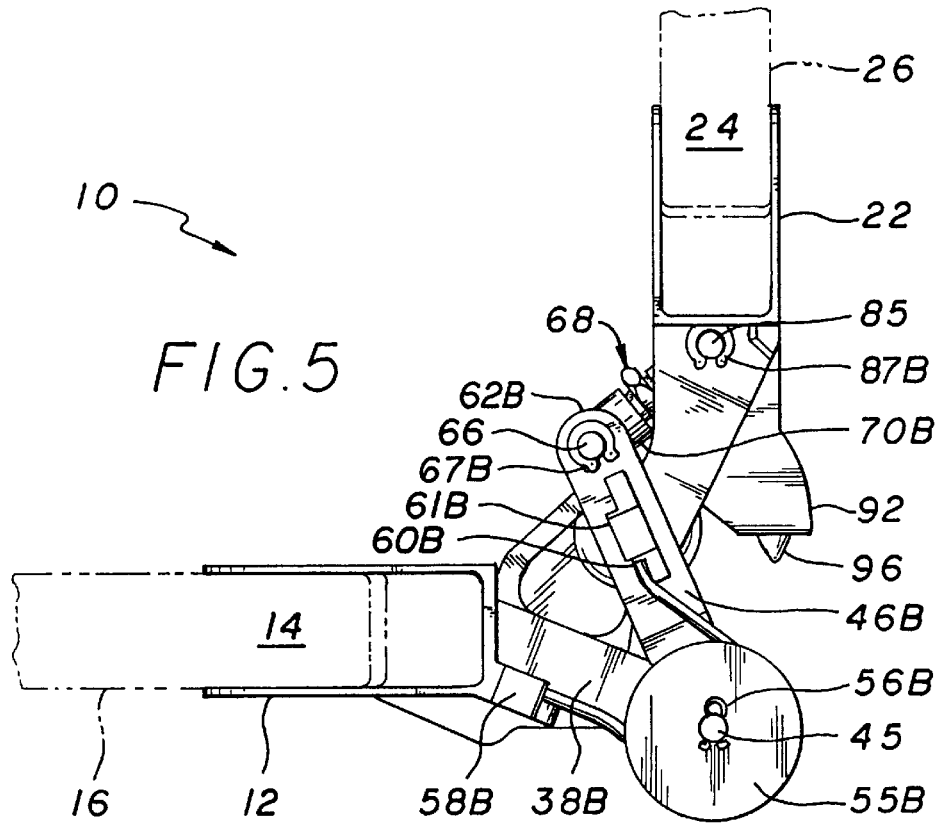
FIG. 5 is a side view of the hinge assembly in the 90 degree position.
Figure 7:
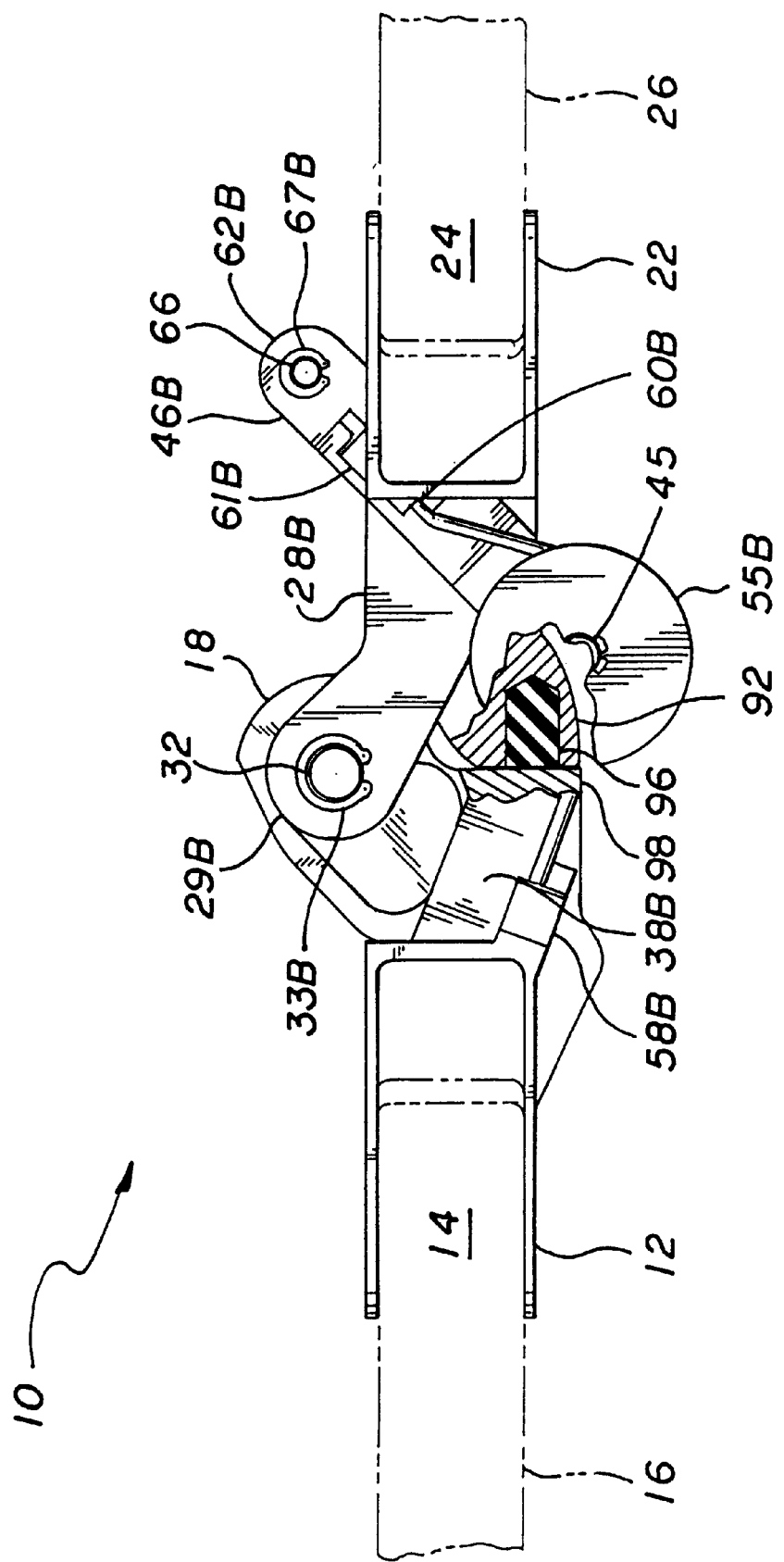
FIG. 7 is a side view of the hinge assembly in the in line position.

Still referring to FIGS. 1–3 and 6, and additionally to FIGS. 4, 5 and 7, the hinge member 22 includes a protrusion 92 having a hole 94 in which is mounted an elastomeric cushioning element 96 that protrudes a short distance there out. The hinge member 12 also includes a protrusion 98. As the torsion springs 54A, B rotate the links 46A, B and 68, it causes the hinge member 22 to rotate from the over lapped position shown in FIGS. 1 and 4 to the inline position shown in FIGS. 2 and 7. Side views of the hinge assembly are shown in FIG. 5 (90 degree position), FIG. 6 (135 degree position) and FIG. 7 (180 degree, full open, position). As the hinge member 22 approaches the in line position, the links 46A,B and 68 go into an over center latching position locking the second hinge 22 in the in line position. Thus the links 46A, B and 68, and the torsional springs 54A, B combine to form an over-center latching mechanism.

Figure 8:
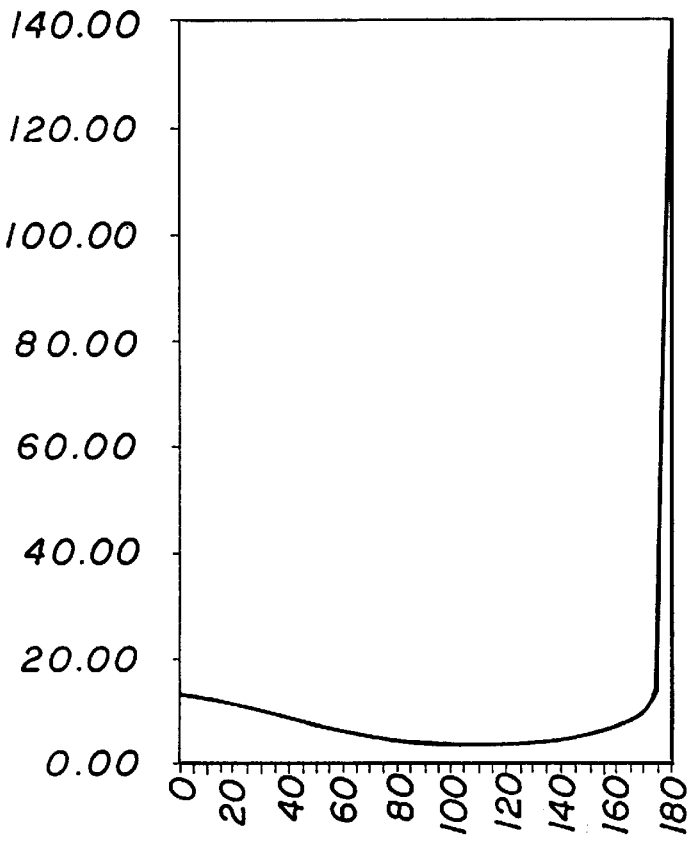
FIG. 8 is a graph of the torque generated by the torsion springs for rotating the second hinge member versus hinge member angle.

In addition, as the hinge member 22 approaches the in line position, cushioning element 96 engages the protrusion 98 on the hinge member 12 and starts to collapse absorbing the rotational forces produced by the torsional springs 54A, B and when the protrusion 98 contacts the protrusion 92 the cushioning element 96 is fully collapsed into the hole 94. Referring to FIG. 8, the torque produced by the over center latch mechanism produces an extremely high torque load during the last few degrees of travel. This high mechanical advantage allows the use of weaker springs 54A, B, allowing a substantial reduction of the accumulated kinetic energy in the system. Thus reducing the loads induced into the solar panels.

Thus it can be seen that the hinge assembly is suitable for unfolding fragile structures such as solar panels on satellites in orbit. Furthermore, it reduces the shock loads upon the hinge members when reaching the in line position. Finally, it automatically locks when reaching the in line position.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

Industrial Applicability

The invention has applicability to satellite manufacturing industry.

What is claimed is:

1. A deployable hinge assembly comprising:
   a first hinge member;
   a second hinge member;
   means for pivotally connecting said first and second hinge members together about an axis of rotation such that said second hinge member is rotatable from an over lapping position with said first hinge member to an inline position therewith;
   an over center latch mechanism coupled to said first and second hinge members for moving said second hinge member from said over lapping position to said inline position and locking said second hinge member in said inline position upon activation, said over center latch mechanism configured such that the deployment torque produced thereby when approaching said inline position is increased;
   biasing means coupled to both said over center latch mechanism and said second hinge member for activating said over center latch mechanism moving said second hinge member from said over lapping position to said inline position; and
   attenuation means for absorbing forces generated by said biasing means as said second hinge member approaches said inline position.

2. The deployable hinge assembly as set forth in claim 1 wherein said over center latch mechanism comprises:

a pair of members having a first end connected to said first hinge member and second ends terminating at a point offset from said axis of rotation of said first and second hinge members;

a first pair of links having first and second ends, said first ends of said first pair of links pivotally connected to said second ends of said members; and a second link having first and second ends, said first end of said second link pivotally connected to said second ends of said first pair of links and said second end of said second link pivotally connected to said second hinge member;

such that upon actuation said pair of first links and said second link are rotated to an over center relationship locking said second hinge member in said in line position.

3. The deployable hinge assembly as set forth in claim 2 wherein said biasing means comprises torsion springs mounted on the pivot axis of said first ends of said first pair of links.

4. The deployable hinge assembly as set forth in claim 1, or, 2, or 3, wherein said attenuation means comprises:

said first and second hinge members having first and second planar surfaces, respectively, said first and second surfaces facing each other when said first and second hinge members are in said in line position;

a hole in said second surface of said second hinge member;

an elastomeric member mounted in said hole and extending out of said hole; and such that as said second hinge member approaches said in line position, said first surface contacts said elastomeric member causing said elastomeric member to compress into said hole as said first surface contacts said second surface upon said second hinge member reaching said in line position.

* * * * *